United States Patent [19]

Yamaki et al.

[11] Patent Number: 4,769,663

[45] Date of Patent: Sep. 6, 1988

[54] CAMERA WITH AN AUTOMATIC FOCUS ADJUSTING APPARATUS

[75] Inventors: Toshio Yamaki, Osaka; Hiromu Mukai, Kawachinagano; Akihiko Fujino; Shuji Izumi, both of Sakai; Masaaki Nakai, Kawachinagano; Nobuyuki Taniguchi, Nishinomiya, all of Japan

[73] Assignee: Minolta Camera Kabushiki Kaisha, Osaka, Japan

[21] Appl. No.: 62,847

[22] Filed: Jun. 16, 1987

Related U.S. Application Data

[63] Continuation of Ser. No. 901,652, Aug. 29, 1986, Pat. No. 4,693,581.

[30] Foreign Application Priority Data

Sep. 2, 1985 [JP] Japan .............................. 60-134687[U]
Sep. 4, 1985 [JP] Japan .............................. 60-135373[U]

[51] Int. Cl.$^4$ .......................... G03B 3/00; G03B 7/091
[52] U.S. Cl. ..................................... 354/400; 354/410
[58] Field of Search ............... 354/400, 402, 410, 412, 354/429, 431–434, 446, 458, 460

[56] References Cited

U.S. PATENT DOCUMENTS

| 4,200,378 | 4/1980 | Shenk ................................ 354/400 |
| 4,455,069 | 6/1984 | Kawamura ........................ 354/434 |
| 4,529,289 | 7/1985 | Tsunefuji et al. ................. 354/433 |
| 4,690,536 | 9/1987 | Nakai et al. ...................... 354/402 |
| 4,693,581 | 9/1987 | Yamaki et al. ................... 354/400 |

FOREIGN PATENT DOCUMENTS

| 53-148638 | 11/1978 | Japan . |
| 57-88416 | 6/1982 | Japan . |
| 169135 | 10/1983 | Japan ........................ 354/410 |

Primary Examiner—W. B. Perkey
Attorney, Agent, or Firm—Burns, Doane, Swecker & Mathis

[57] ABSTRACT

This invention is directed to a camera provided with an automatic focus adjusting apparatus in which, in addition to the function of carrying out an AE lock based on an in-focus detection, an AE lock can be carried out either before or after an AF operation is completed or when an AF operation is impossible. In other words, irrespective of the condition of an automatic focus adjusting means, an AE lock can be accomplished at any desired moment. Therefore, the degree of freedom in a photography operation is expanded.

1 Claim, 10 Drawing Sheets

CAMERA WITH AN AUTOMATIC FOCUS ADJUSTING APPARATUS

This is a continuation of application Ser. No. 901,652, filed Aug. 29, 1986, now U.S. Pat. No. 4,693,581.

BACKGROUND OF THE INVENTION

1. Field of the Invention

The invention relates to a camera with an automatic focus adjusting apparatus having a function of locking (referred to as AE lock hereinafter) metered light data according to which an automatic exposure control is carried out upon completion of an automatic focus adjusting operation (which is referred to as AF operation hereinafter).

2. Description of the Prior Art

A camera having an automatic focus adjusting apparatus known in the art and having the above-described function, has been disclosed in the Japanese Laid-open Utility Model Publication No. 148638/1978.

The AE lock operation according to the above-described apparatus is as follows:

(1) An AF operation is started by actuating an AF operation starting button.

(2) When an objective lens is moved to an in-focus position, the in-focus detection is carried out. After the in-focus detection is carried out, AF operations are prohibited and a metered light data is automatically AE locked by operating an AE lock switch provided in addition to a switch for storing metered light data; that is, an AE lock is carried out according to the in-focus detection.

(3) Thereafter, a shutter release button is operated at any desired point to start an exposure control operation; that is, a mirror is turned up by depressing the shutter release button to release a shutter and an exposure control is carried out in accordance with the metered light data which have been locked by the in-focus detection carried out in (2).

Besides the above-described apparatus, a camera provided with an automatic focus adjusting apparatus has been disclosed in the Japanese Laid-open Patent Publication No. 88416/1982 is known in the art. The apparatus is provided with an AE lock button in addition to a focus lock button. The AE lock is carried out either by operating only the AE lock button or only the focus lock button.

The apparatus disclosed in the Japanese Laid-open Utility Model Publication No. 148638/1978, however, has the following disadvantages.

An AE lock cannot be carried out before starting an AF operation which necessitates an operation of an AF operation starting button.

Furthermore, an AE lock cannot be carried out arbitrarily before carrying out in-focus detection. In other words, the apparatus is not provided with an AE lock operation means which can be independently operated, so that an in-focus detection caused AF operation stop cannot be released by an AE lock operation.

Still further, an AE lock according to an in-focus detection is restricted by an AF operation, so that an AE lock operation cannot be carried out at any desired time after an in-focus detection is accomplished.

From the foregoing, the degree of freedom in photography according to this prior art apparatus is low.

The apparatus disclosed in the Japanese Laid-open Patent Publication No. 88416/1982 has the following disadvantages.

(1) An AE lock is performed either by an operation of an AE lock button or a focus lock button and not by a detection of the in-focus condition; that is, an AE lock cannot be automatically carried out according to an in-focus detection. Therefore, an AE lock necessitates an operation of an AE lock button or a focus lock button. Hence, non-preferable operation is necessary.

(2) Since an AE lock is performed by operating a focus lock button, the AE lock cannot be released by an operation of the AE lock button at any desired time; that is, the AE lock state created by the operation of the focus lock button is maintained, so that metered light data cannot be updated. Thus, this prior art apparatus has also a low degree of freedom in photography.

The above-described prior art apparatus disclosed in the Japanese Laid-open Utility Model Publication No. 148638/1978 has two modes in the automatic focus adjusting operation (referred to as AF operation hereinafter) and one mode in manual focus adjusting operation (referred to as FA hereinafter).

In the first mode, light data metered under spot light metering mode is stored when in-focus detection is completed i.e. at the time an AF operation has been completed.

In the second mode, measured light data is stored in unison with a shutter release operation after an AF operation is completed.

In the third mode, metered light data is stored in unison with a shutter release operation after a focus adjustment is manually operated.

The operation of the first mode is as follows:

(1) The first mode is selected by operating a mode selection operation button.

(2) An AF operation is started by operating an AF operation starting button.

(3) When an objective lens is moved to an in-focus position, an in-focus detection is carried out. According to an in-focus detection signal, sequential AF operations are prohibited and metered light data is stored by actuating a memory switch; that is, a AE lock is carried out according to a detection of an in-focus condition.

(4) Thereafter, a shutter release button is operated at any desired moment to start an exposure control operation; that is, a depression of the shutter release button permits a turn-up of a mirror and a start of a shutter release operation, whereby an exposure control operation is carried out according to the metered light data stored by the in-focus detection in (3).

In a photographing operation, according to the first mode, a light metering mode is restricted to spot light metering mode and a portion of an object to which a distance is metered coincides with a portion of the object brightness of which is metered; that is, an object can be photographed in an in-focus and suitable exposure condition even if a target to be photographed is changed after distance metering and an AE lock are carried out.

The prior art apparatus described above, however, has the following disadvantages.

When an object is photographed in the first mode (spot light metering mode) in which an AE lock is carried out according to an in-focus detection, an in-focus detection is impossible when the contrast of an object is low, so that an AE lock cannot be accomplished according to an in-focus detection.

If an exposure control operation is carried out by operating a shutter release button in a condition in which an in-focus detection is impossible, the following disadvantages arise.

There is no quarantee whether or not a main object to be focused is within a focus detecting zone. Moreover, an AE lock operated of metered light data under the spot light metering mode is not carried out upon completion of an AF operation, so that an exposure control is carried out according to the light metering data, under the spot light metering mode, which is obtained when a shutter release button is operated. As a result, an appropriate exposure is not guaranteed.

As apparent from the foregoing, it can be concluded that, considering the case spot light metering data are AE locked according to an AF operation completion (in-focus detection), an inappropriate exposure of an object occurs in the prior art apparatuses when an in-focus detection cannot be carried out because of low contrast of the object.

SUMMARY OF THE INVENTION

The invention has been made in view of the above-described problems. It is a first object of the present invention to expand the degree of freedom in a photography operation. The object is achieved by providing the following automatic focus adjusting apparatus; that is, in addition to the function of carrying out an AE lock based on an in-focus detection, an AE lock can be carried out either before or after an AF operation is completed or when an AF operation is impossible. In other words, irrespective of the condition of an automatic focus adjusting means, an AE lock can be accomplished at any desired moment. If an AE lock is carried out prior to the achievement of an in-focus condition, further light metering is not utilized even when the in-focus condition is reached.

It is a second object of the present invention to provide a camera having an automatic focus adjusting apparatus which has a function of carrying out an AE lock of metered light data under spot light metering made according to a completion of an AF operation, in which an inappropriate exposure of a main object to be photographed does not occur even when an in-focus detection cannot be accomplished because of lack of contrast (low contrast) of the object.

BRIEF DESCRIPTION OF THE DRAWINGS

The above objects and features of the present invention will become apparent from the following description taken in conjunction with the preferred embodiment thereof, with reference to the accompanying drawings, in which.

DETAILED DESCRIPTION OF THE PREFERRED EMBODIMENT

Figure 1A:
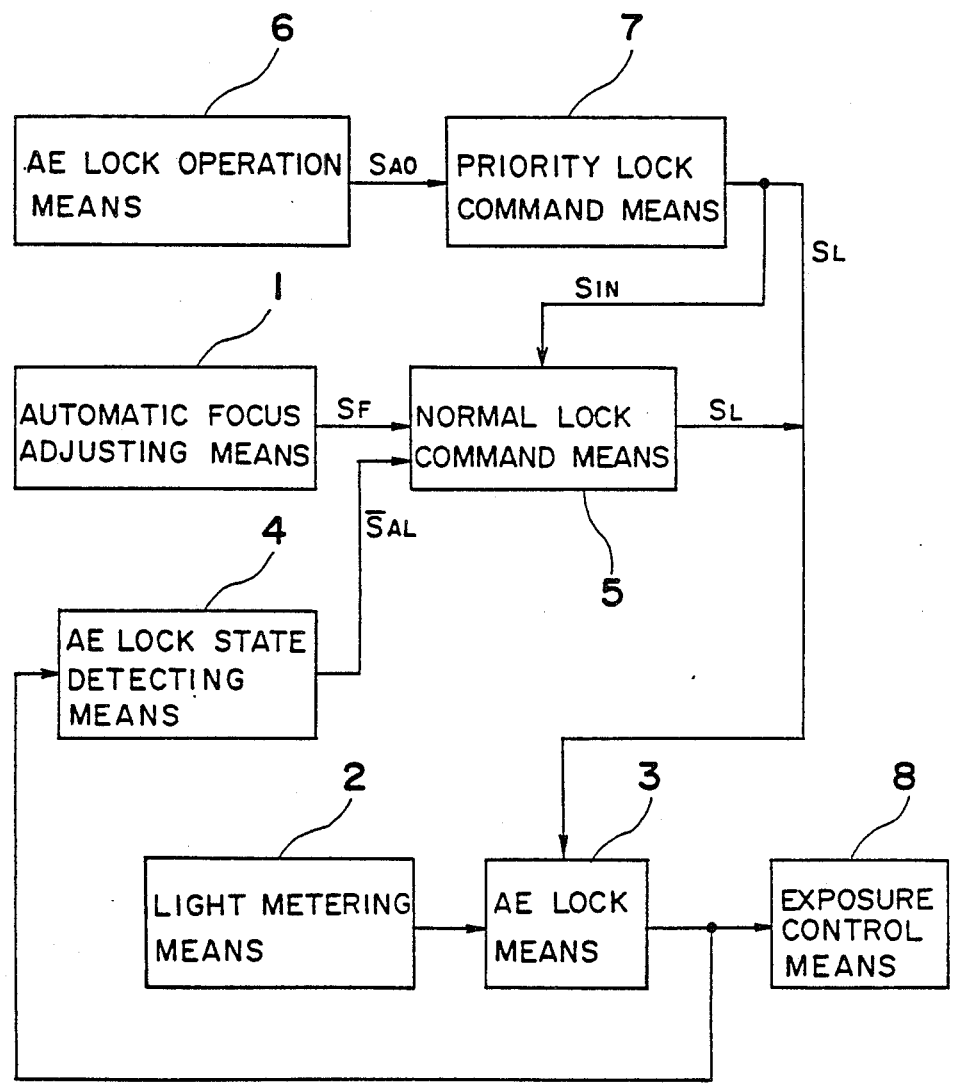
FIGS. 1A and 1B are brief block diagrams showing features of a camera with an automatic focus adjusting apparatus according to an embodiment of the present invention.

Before the description of the present invention proceeds, it is to be noted that like parts are designated by like reference numerals and symbols throughout several views of the accompanying drawings.

The outline of the first feature of the present invention is described in conjunction with FIG. 1A.

The camera system is provided with an automatic focus adjusting means 1. The automatic focus adjusting means 1 detects an in-focus and defocus condition and performs an automatic focus adjusting operation according to a defocus detection, and after an in-focus state is achieved, stops the automatic focus adjusting operation and outputs an in-focus state signal $S_F$.

The camera system is further provided with an AE lock means 3 for fixedly storing an output from a light metering means 2 according to a lock command signal $S_L$; and an AE lock state detecting means 4 for detecting the state of the AE lock means 3.

The camera system is further provided with a normal lock command means 5 for outputting a lock command signal $S_L$ to the AE lock means 3 in response to the in-focus state signal $S_F$ outputted from the automatic focus adjusting means 1 and in response to non-AE lock signal $\overline{S}_{AL}$ outputted from the AE lock state detecting means 4.

The camera system is further provided with an AE lock operating means 6 for arbitrarily carrying out an AE lock; and a priority lock command means 7 for outputting a normal lock output prohibition signal $S_{IN}$ which prohibits the normal lock command means 5 from outputting the lock command signal $S_L$ to the normal lock command means 5 and for outputting the lock command signal $S_L$ to the AE lock means 3.

The camera system is further provided with an exposure control means 8 for controlling exposure according to an output from the AE lock means 3.

The operation of the above-described structure of the camera system is as follows:

(I) When an AE lock operation is not being carried out by the AE lock operation means 6, the non-AE lock signal $\overline{S}_{AL}$ is outputted from the AE lock state detecting means 4 to the normal lock command means 5.

When an in-focus state signal $S_F$ is inputted from the automatic focus adjusting means 1 in this condition, the lock command signal $S_L$ is outputted from the normal lock command means 5 to the AE lock means 3 and the AE lock means 3 performs a fixed storage of metered light data outputted from the light metering means 2, which is referred to as AE lock.

The exposure control means 8 carries out an exposure control according to light metering data fixedly stored at the AE lock means 3.

In this case, a portion of an object to which a distance is metered coincides with a portion of the object to which brightness is metered, so that a normal automatic focus operation, i.e. AF operation, and an automatic exposure control are carried out.

Thus, an AE lock operation is automatically accomplished according to an in-focus detection signal. In this respect, the camera system according to the present invention is, at the operation, more preferable than the prior art apparatus shown in Japanese Laid-open Patent Publication No. 88416/1982, in which AE lock operations are carried out by operating focus lock button.

(II) When an AE lock operation is carried out by the AE lock operation means 6, the priority lock command means 7 outputs the normal lock output prohibition signal $S_{IN}$ to the normal lock command means 5 according to an output signal from the AE lock operation means 6, and prohibits the normal lock command means 5 from outputting the lock command signal $S_L$; that is, an AF operation caused by the normal lock command means 5 releases restriction made to the AE lock.

Besides the above-described operation of the priority lock command means 7, it outputs the lock command signal $S_L$ to the AE lock operation means 6.

As described above, when the AE lock operation means 6 is operated, the lock command signal $S_L$ is outputted from the priority lock command means 7 to the AE lock means 3, with an output from the normal lock command means 5 prohibited. Therefore, the AE lock means 3 is AE locked or performs a fixed storage of metered light data outputted from the light metering means 2 according to the lock command signal $S_L$ transmitted from the priority lock command means 7 irrespective of the condition of the automatic focus adjusting means 1.

The exposure control means 8 carries out an exposure control according to metered light data fixedly stored at the AE lock means 3. In other words, an operation of the AE lock operation means 6 permits an AE lock at any desired time either before a start of an AF operation or after a completion of an AF operation or an AF operation cannot be carried out—i.e., irrespective of the condition of the automatic focus adjusting means 1.

As a result, according to metered light data fixedly stored at the AE lock means 3 by an AE lock, an appropriate exposure control is accomplished in an object to which light is metered when the AE lock operation means 6 is operated.

Owing to the mechanism provided with the camera system according to the present invention, an object can be photographed in an appropriate exposure even if a portion of an object to which a focusing condition is detected does not coincide with a portion of the object whose brightness is measured. Thus, compared with the above-described two prior art apparatuses (Japanese Laid-open Utility Model Publication No. 148638/1978 and Japanese Laid-open Patent Publication No. 88416/1982), the degree of freedom in composition in a photography operation is wider.

Figure 1B:
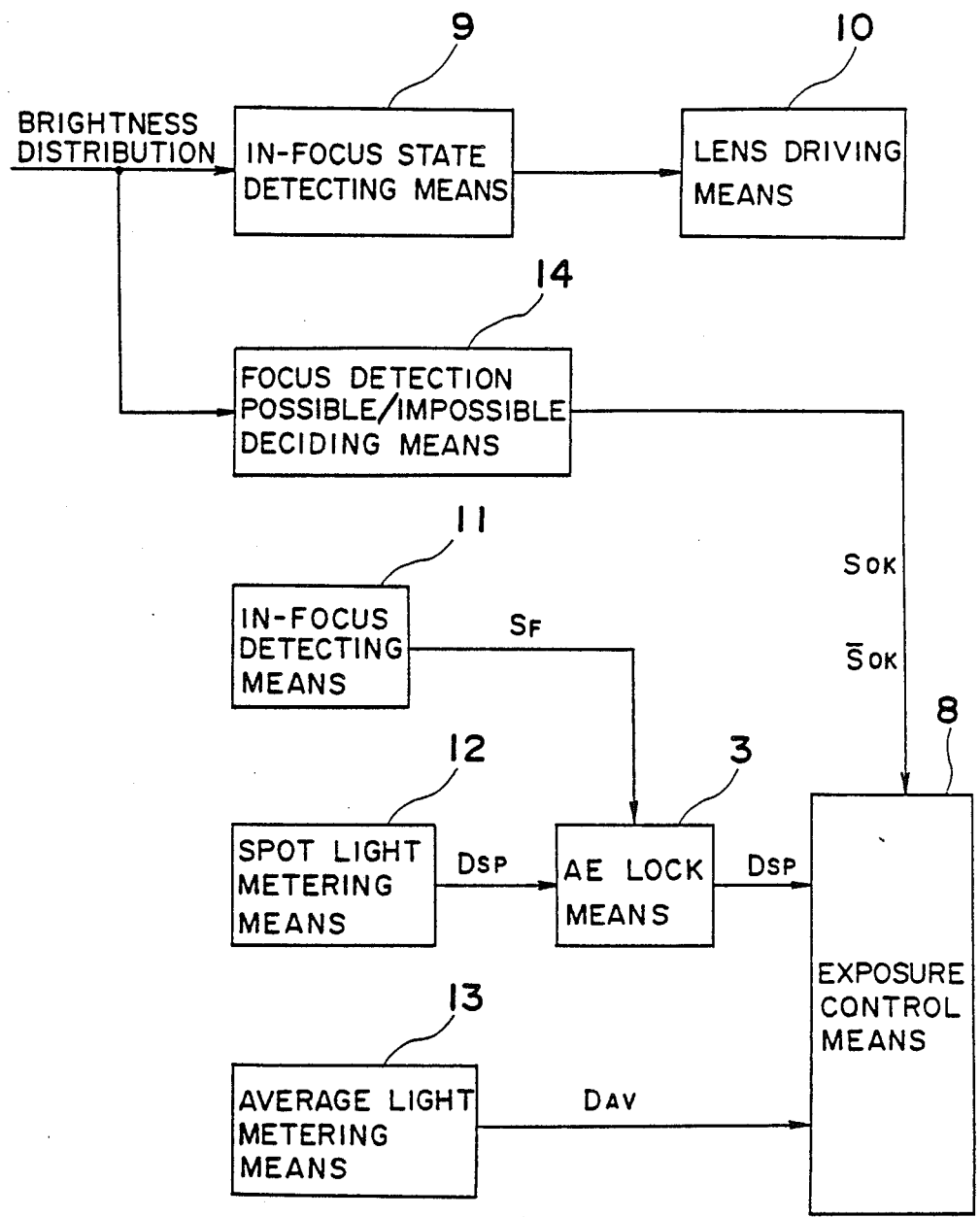

Next, the outline of the second feature of the present invention is described with reference to FIG. 1B.

The camera system is provided with an in-focus state detecting means 9 for detecting whether or not an objective lens is in-focus condition according to the brightness distribution of an image formed by light which has been reflected from an object and passes through the objective lens; a lens driving means 10 for moving the lens to the in-focus position according to an output from the in-focus detecting means 9; an in-focus detecting means 11 for outputting an in-focus detection signal $S_F$ when the lens has been moved to the in-focus position by the lens driving means 10.

The camera system is further provided with a spot light metering means 12 for metering the brightness of a spot zone of the image formed by light which has reflected from an object and passes through the objective lens. The spot zone includes focus detecting zone to be carried out a detection of an in-focus state detecting means 9; the AE lock means 3 for carrying out a fixed storage of spot light metering data $D_{SP}$ outputted from the spot light metering means 12 according to the in-focus detection signal $S_F$ outputted from the in-focus detecting means 11.

The camera system is further provided with an average light metering means 13 for carrying out average metering of light which has reflected from an object and passes through the objective lens; and an in-focus/-defocus detecting means 14 for deciding whether or not the focus detection of the in-focus state detecting means 9 is possible based on the brightness distribution of the image formed by the light reflected from an object.

The camera system further comprises the exposure control means 8 for inputting the spot light metering data $D_{SP}$ fixedly stored at the AE lock means 3 when a signal $S_{OK}$ which indicates that an in-focusing is possible, is inputted thereto from the focus detection deciding means 14 during exposure control time period and carrying out an exposure control according to the the spot metering light metering data $D_{SP}$ and inputting the average light metering data $D_{AV}$ from the average light metering means 13 when a signal $\overline{S}_{OK}$, which indicates that an in-focusing is impossible, is inputted from the focus detection deciding means 14 and carrying out an exposure control according to the average light metering data $D_{AV}$.

The operation of the above-described structure is as follows.

(I) if the brightness distribution of the image formed by light reflected from an object is enough to carry out a focus detection in the in-focus state detecting means 9, the lens driving means 10 moves the lens to the in-focus position. When the lens is moved to the in-focus position, the in-focus detecting means 11 outputs the in-focus detection signal $S_F$ to the AE lock means 3 and AE lock means 3 carries out a fixed storage of metered light data $D_{SP}$ outputted from the spot light metering means 12.

Since the focus condition deciding means 14 outputs a signal $S_{OK}$, which indicates that the focus detection is possible, to the exposure control means 8, the exposure control means 8 receives the spot light metering data $D_{SP}$ fixedly stored at the AE lock means 3 and carries out an exposure control according to the data of the spot metering. This is referred to as spot light metering mode.

(II) The lens driving means 10 is incapable of carrying out the focus adjustment of the lens according to the output from the in-focus state detecting means 11 if condition is such that the focus detection deciding means 11 is incapable of carrying out a preferable focus detection because the contrast of the brightness distribution of the image formed by light reflected from an object is low. Accordingly, an in-focus detection signal $S_F$ is not outputted from the in-focus detecting means 11. Because of this, a fixed storage, i.e. AE lock, of the data of spot metering by the AE lock means 3 cannot be carried out.

The focus detection deciding means 14 outputs a signal $\overline{S_{OK}}$, indicating that focus detection is impossible, to the exposure control means 11, so that the exposure control means 11 receives the metered light data $D_{AV}$ from the average light metering means 13 and carries out an exposure control according to the metered light data. This is referred to as average light metering mode.

Since control of exposure by the average light metering mode enables a proper exposure even if the main object is out of the spot zone, a proper exposure control can be accomplished even if an AE lock of a spot light metering data is possible since a focus detection is possible because of low contrast.

It is to be noted, here, that the exposure operation by the average light metering mode is different from the prior art exposure operation in that the exposure operation is carried out by the spot light metering data is AE locked according to an in-focus detection.

A preferred embodiment which has the above-described first and second characteristic features is described in detail below.

Structure

Figure 2:
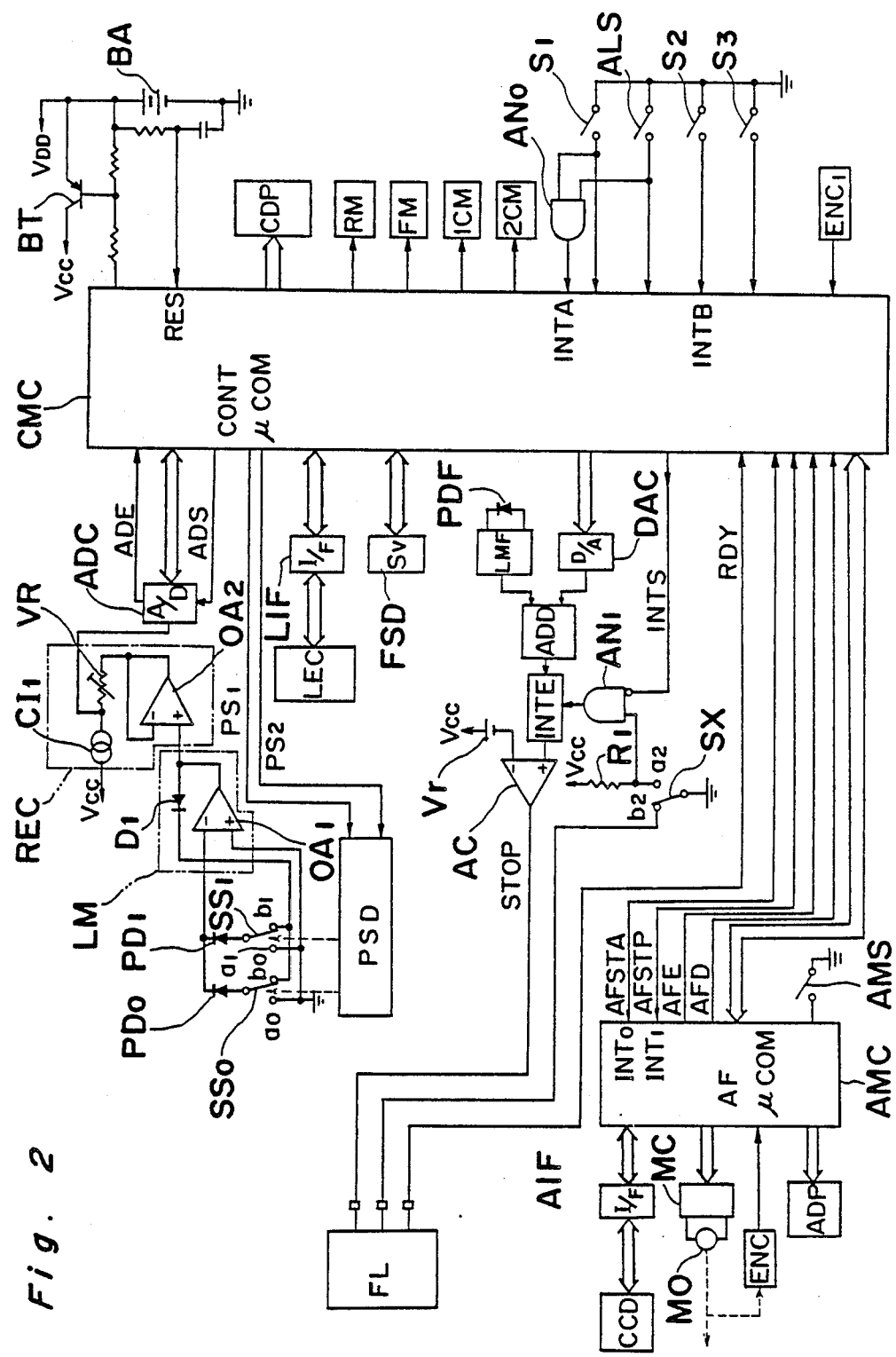
FIG. 2 is a circuit diagram showing a camera indicated in FIGS. 1A and 1B.

Referring to FIG. 2, there is shown a camera with an automatic focus adjusting apparatus according to an embodiment of the present invention.

A reference character BA designates a power source battery. BT is a power supplying transistor. CMC is a microcomputer which controls the camera system. The microcomputer is hereinafter referred to as a control microcomputer. AMC is a microcomputer (the microcomputer is hereinafter referred to as an AF microcomputer.) which controls the automatic focus adjusting operations.

CDP is an indicator that indicates exposure control data and other data. RM is a release magnet that starts a diaphragm operation. FM is a diaphragm magnet that stops a diaphragm operation and turns a mirror up. 1CM is first curtain magnet. 2CM is a second curtain magnet.

$S_1$ is a light metering switch which is normally open. ALS is an AE lock switch which is normally open. $S_2$ is a release switch connected to an interruption terminal 1NTB of the control microcomputer CMC which starts an operation of the control microcomputer CMC. $S_3$ is a reset switch.

ANo is an AND gate. The light metering switch S1 and AE lock switch ALS are connected to the respective input terminals of the AND gate, respectively.

The metering switch S1 is turned ON when the shutter release button (not shown) is depressed to the first step. The release switch $S_2$ is turned ON when the shutter release button is pushed to the second step. The AE lock switch ALS is turned ON when the AE lock button is pushed and turned OFF when the AE lock button (not shown) is released.

Touch type switches may be used as the light metering switch $S_1$ and the AE lock switch ALS.

The reset switch $S_3$ is turned ON when an exposure has been carried out, that is, ON before a shutter, which comprises the first curtain and the second curtain, is charged and is OFF when a film has advanced, i.e. the shutter has been charged. ENC1 is an aperture encoder which outputs a pulse signal in unison with a diaphragm operation.

Figure 3:
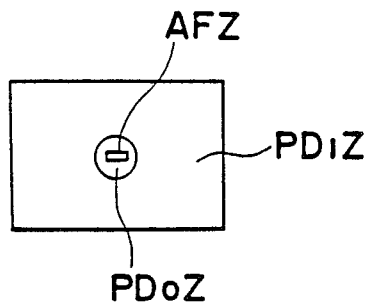
FIG. 3 is an illustration of the brightness degree of distribution in the optical path of a finder.

FIG. 3 shows sensitivity distribution in a finder image. PDoZ is a spot zone. $PD_1Z$ is an ambient zone in the periphery of the spot zone PDoZ. AFZ is a focus detecting zone, for accomplishing an automatic focus detection, inside the spot zone (PDoZ).

PDo shown in FIG. 2 is a spot zone light receiving element corresponding to the spot zone PDoZ. $PD_1$ is the ambient zone light receiving element corresponding to the ambient zone $PD_1Z$. The light receiving elements PDo and $PD_1$ comprise photodiodes.

The light receiving element PDo for the spot zone $PD_0Z$ and the light receiving element $PD_1$ for the ambient zone $PD_1Z$ are connected to the light receiving element selection circuit PSD, respectively via switches SSo and $SS_1$. The contacts $a_o$ and $a_1$ of the switches SSo and $SS_1$ are grounded and the contacts $b_o$ and $b_1$ thereof are connected to the inversion input terminal of the operational amplifier $OA_1$. The light receiving element selection circuit PSD is connected to the control microcomputer CMC via the signal lines $PS_1$ ad $PS_2$.

The operation of the light receiving element selection circuit PSD is an shown in Table 1.

TABLE 1

| $PS_1$ | $PS_2$ | $SS_0$ | $SS_1$ | Light receiving element | Light metering mode | Area ratio |
|---|---|---|---|---|---|---|
| H | H | $a_0$ | $a_1$ | $PD_0$ + $PD_1$ | Average Bva | 10 |
| L | H | $a_0$ | $b_1$ | $PD_0$ | Spot Bvs | 1 |
| H | L | $b_0$ | $a_1$ | $PD_1$ | Ambient $Bv_1$ | 9 |

Bva, Bvs, and $Bv_1$ in Table 1 indicate, respectively, the brightness data of an object in an average light metering mode, a spot light metering mode, and an ambient light metering mode.

A light metering circuit LM of a logarithmic compression amplifier type comprises the operational amplifier $OA_1$ and a diode $D_1$. An adjusting circuit REC to adjust fluctuation of an output from the light metering circuit LM comprises a constant current power supply $CI_1$, a variable resistance VR, and an operational amplifier $OA_2$.

An A/D converting circuit ADC connected to the control microcomputer CMC starts an A/D conversion according to a temporary negative edge of a signal passing through a signal line ADS and converts a signal passing through a signal line ADE from "H" level to "L" level upon completion of A/D conversion.

LEC is an output circuit of lens data in interchangeable lens (not shown) mounted on the camera body (not shown). The LEC outputs minimum aperture data Avo, the maximum aperture data Avmax, and automatic focus adjusting data.

LIF is an interface circuit connected between the lens data output circuit LEC and the control microcomputer CMC. FSD is an output circuit of the film sensitivity data Sv.

FL is a flash circuit. When a main capacitor of the flash circuit FL is charged, the level of a signal passing through a signal line RDY, which connects the flash circuit FL to the control microcomputer CMC, becomes "H".

The flash circuit FL emits light when a switch SX acts such that a movable contact comes into contact with a contact $b_2$. The movable contact of the switch SX is changed from the contact $a_2$ to the contact $b_2$ when the first curtain of the shutter has passed through a predetermine distance.

PDF is a light receiving element which is disposed at a position close to a frame of a film to be taken comprises a photodiode, to receive light from an object, which has passed through lens the after a mirror had been turned up. LMF is a light metering circuit of the logarithmic compression amplifier type, similar to the light metering circuit LM comprising the above-described operational amplifier $OA_1$ and the diode $D_1$. The element LMF is connected to the element PDF.

DAC is a D/A conversion circuit to convert the film sensitivity data Sv (or Sv+α; α will be described below). ADD is an adder which adds the brightness data Bvf, of an object, outputted from the light metering circuit LMF to the film sensitivity data Sv (or Sv+α) outputted from the D/A conversion circuit DAC. INTE is an integrator which logarithmically expands an output from the adder ADD. $AN_1$ is an AND gate to activate the integrator INTE. One of its input terminals is connected to the control microcomputer CMC through a signal line INTS and its other input terminal is connected to a D.C. power source Vcc through a pull-up register $R_1$.

The integrator INTE starts an integration when the output signal from the AND gate $AN_1$ becomes "H" level, that is, when an exposure control operation starts so that the signal line becomes "L" level and the movable contact of the light switch SX is moved from the contact $a_2$ to the contact $b_2$ so that a light emission of the flash circuit FL is effected.

AC is a comparator connected to the integrator INTE. Vr is a reference power supply for the comparator AC. STOP is a signal line to connect the flash circuit FL to the comparator AC. When the light, emitted from the flash circuit FL and reflected from the object, is received by the light receiving element PDF on the film and accordingly the level of the output signal of the integrator INTE reaches the level of the reference power supply Vr, a signal having the level of "H" is outputted from the comparator AC to the signal line STOP, thereby stopping an emission of light from the flash circuit FL.

CCD is a AF light receiving element and comprises a CCD (Charge Coupling Element) array. AIF is an interface connected between the AF light receiving element CCD and the AF microcomputer AMC.

MO is a motor which drives the lens unit (not shown) of the interchangeable lens. MC is a control circuit for the motor MO. ENC is a AF encoder to monitor a position of the lens unit, namely, the rotation amount of the motor MO.

ADP is a AF indicator. AMS is a manual switch which is turned ON under AF (auto focus) mode and turned OFF under FA (manual focus) mode.

An operation of AF microcomputer AMC is started when in response to a negative edge of a signal passing through a signal line AFSTA, which connects the interrupting terminal $INT_o$ to the control microcomputer CMC, while an operation of the AF microcomputer AMC is stopped in response to a negative edge of a signal passing through a signal line AFSTP, which connects the interrupting terminal $INT_1$ to the control microcomputer CMC.

The program is so constructed that the information of a termination of an AF operation is transmitted to the control mirocomputer CMC to permit shutter release when a signal line AFE becomes "L" level and the information that an AF operation cannot be carried out or the program is under FA mode which makes a focus detection but does not drive a lens unit when the signal line AFD becomes "L" level.

Operation

The operation of a camera with the automatic focus adjusting apparatus of this embodiment is described with reference to FIGS. 4 through 12.

Operation of the control microcomputer CMC

FIG. 4 and FIGS. 6 through 10 are the flow charts of the control microcomputer CMC.

Main routine

First, the operation of the main routine which is started by an interruption of INTA is described with reference to FIG. 4.

When a light metering switch $S_1$ is turned on by a depression of the shutter release button to the fast step or an AE lock switch ALS is turned on by a depression of an AE lock button, an interruption of an interruption terminal INTA occurs, thereby starting an operation of the control microcomputer CMC.

At step #1, flags are reset. At step #2, the power supply transistor BT connected to the battery BA is turned ON to start the power supply through the D.C. power source Vcc. At step #3, the level of signal lines $PS_1$ and $PS_2$ connected to the light receiving selection circuit PSD is set to "H" and both switches SSo and $SS_1$ are changed over to the contacts $a_o$ and $a_1$, respectively, whereby the average light metering mode is set.

At step #4, it is decided whether the light metering switch $S_1$ is ON or OFF. When it is ON, the program advances to step #5 and the level of signal line AFSTA is set to the "L" and the AF microcomputer AMC is activated, and thereafter, the program advances to step #6. The AF microcomputer AMC is operated only when the light metering switch $S_1$ is ON.

When the light metering switch $S_1$ is OFF at step #4, the program advances to step #6 and the level of the signal line AFSTP is set to "L", thereby prohibiting the operation of the AF microcomputer AMC. Next, the program advances to step #7, and after an AF completion flag is reset, the program advances to step #8.

AT step #8, lens data such as minimum aperture value data AVo, maximum aperture diaphragm data Avmax, automatic focus adjusting data are inputted from the lens data output circuit LEC to the control microcomputer CMC through the interface LIF. At step #9, the film sensitivity data Sv is inputted from the output circuit FSD to the control microcomputer CMC. At step #10, an automatic focus adjusting lens data are outputted from the control microcomputer CMC to the AF microcomputer AMC.

At step #11, it is detected whether the level of the signal line AFD is "L". If it is "L", either an AF operation cannot be carried out or the program is under FA mode. In this case, the program advances to step #13.

If the level of the signal line AFD is detected to be "H" at step #11, an AF operation can be carried out. In this case, the program advances to step #12 and detects whether or not the level of the signal line AFE is "L". If the level of the signal line AFE is "H", that is, if the AF operation has not been completed, the program, then, advances to step #13.

(a) When AF operation is impossible or has not been completed or the program is under FA mode:

The program detects whether or not the AE lock switch ALS is ON at step #13. The flow after step #13 is described in four cases.

(1) The moment AE lock switch ALS is turned ON:

If it is detected at step #13 that the AE lock switch ALS is ON, the program advances to step #14 and it is detected whether or not the flat $ALF_2$, which makes an indication when or not the AE lock switch ALS has turned ON, carries "1". If it is detected that the flag $ALF_2$ does not carry "1", this means that the AE lock switch ALS turns ON at this moment.

In this case, the program advances to step #15 and sets both the flag $ALF_2$, which makes an indication when the AE lock switch has turned ON, and the flag $ALF_1$, which makes an indication if the AE lock switch ALS is under AE lock state, to carry "1", and thereafter, advances to step #25 in order to input the metered light data.

The moment the AE lock switch ALS is turned ON, the program advances to a subroutine to input the metered light data at this moment.

(2) When AE lock switch ALS has turned ON:

If it is detected at step #13 the AE lock switch ALS is ON and at step #14 that the flag $ALF_2$, which makes an indication when the AE lock switch ALS is ON, carries "1", the program advances to step #50 not to step #25.

If the AE lock switch ALS is ON, the metered light data has been inputted by the flow as described above in the item (1), however, as long as the AE lock switch ALS maintains ON state, the metered light data is not updated i.e., the AE lock switch is in lock state.

(3) When the AE lock switch ALS is OFF after it has been ON:

If it is detected at step #13 that the AE lock switch ALS is OFF, the program advances to step #16 and resets the flag $ALF_2$ which indicates that the AE lock switch ALS is ON.

Next, it is detected at step #17 whether or not the flag $ALF_1$, which indicates that the AE lock switch is in lock state, is carrying "1". If the flag $ALF_1$ is detected to be carrying "1", that is, the AE lock switch ALS has been turned ON, the program does not advance to step #25 but to step #50 because the AE lock switch is in lock state.

Even if the AE lock switch ALS is OFF, the metered light data is not updated while the flag $ALF_1$, which indicates that the AE lock switch is in lock state, is carrying "1". In other words, once the AE lock switch ALS is set in lock state, the AE lock state is maintained even if the AE lock switch ALS is turned OFF.

If the metered light data is to be updated during AE lock state, the AE lock button is pressed again to turn ON the AE lock switch ALS to input a metered light data which is to be updated to the program in the flow of steps #13, #14, #15 and #25, and subsequently at the next cycle an AE lock is carried out by the flow of steps #13, #14 and #50.

(4) When AE lock switch has not turned ON:

When it is detected at step #13 that the AE lock switch ALS is ON, the flag $ALF_2$, which indicates that the AE lock switch ALS has turned ON, is reset at step #16.

Next, it is detected at step #17 whether or not the flag $ALF_1$, which indicates that the AE lock switch is in lock state, carries "1". No indication of "1" by the flag $ALF_1$ means that the AE lock switch ALS has not yet turned ON. The program, then, advances to step #25 to update the metered light data; that is, a metered light data may always be inputted in the order of steps #13, #16, #17 and #25.

Figure 5:
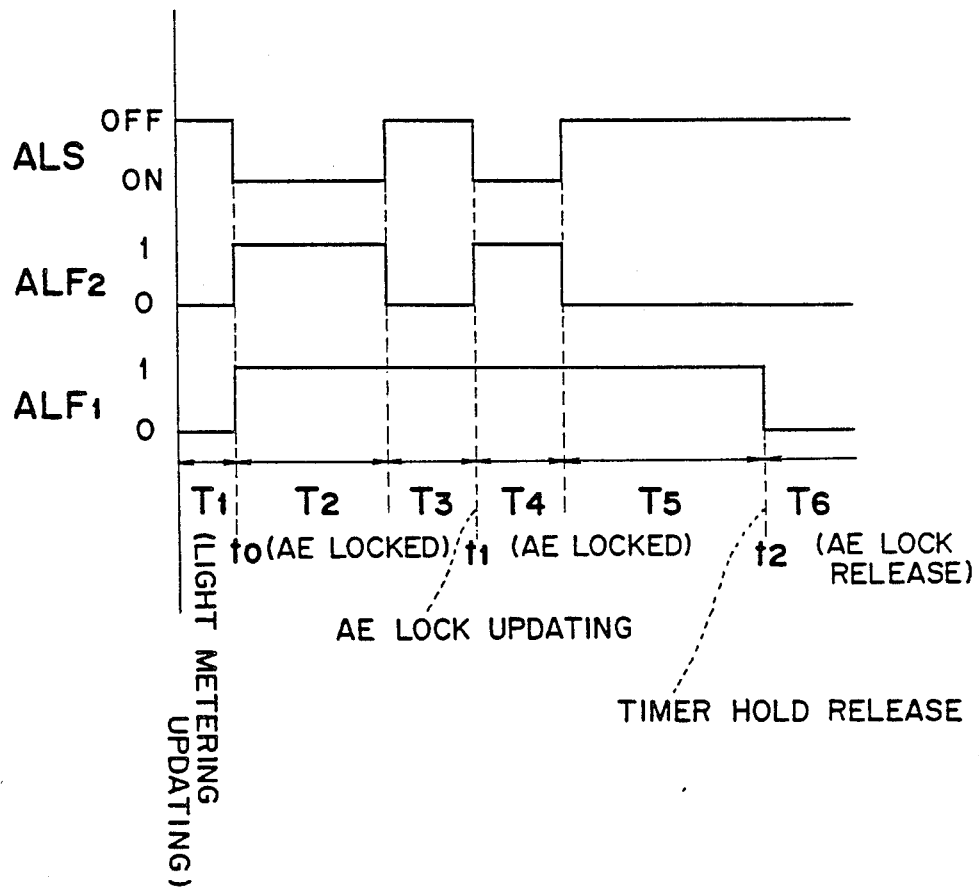
FIG. 5 is a time chart with respect to the main routine shown in FIG. 4.

FIG. 5 is the summary of the operations from (1) through (4).

$T_1$ indicates the initial state in which the light metering switch $S_1$ is ON and the AE lock switch ALS is OFF. This means that the metered light data has been updated.

$T_2$ indicates the state that the AE lock switch ALS is ON, namely, AE lock state. The metered light data is updated at time $t_o$, and then, an AE lock is carried out, and thereafter, the AE lock state is maintained.

$T_3$ indicates the AE lock switch ALS is turned to the OFF state from ON state. During this period of time, the AE lock state is maintained.

$T_4$ indicates the state that the AE lock switch ALS is turned ON again i.e., the AE lock state as well as metered light data is updated at time $t_1$. After this operation is carried out, the AE lock state is maintained.

$T_5$ indicates the state that the AE lock switch ALS is changed from ON state to OFF state. As in the state $T_3$, the AE lock state is maintained during this period of time.

Figure 10:
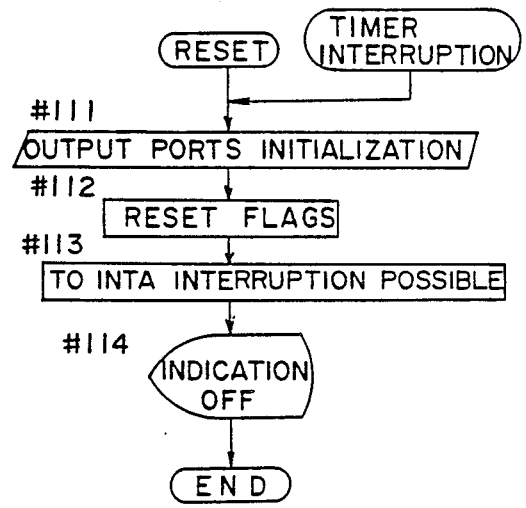
FIG. 10 is a flow chart showing an operation of a timer interruption subroutine.

Time $t_2$ indicates the moment the AE lock state is released as a result of the release of a timer hold carried out at step #11, described below in FIG. 10, during the flow from steps #78, #79, and #80 in FIG. 7 (described later). After the state $T_6$, the AE lock state continues.

(b) When AF operation is completed:

When it is detected at step #12 that the level of the signal line AFE is "L", this means that an AF operation has been completed. Then, the program advances to step #18 and it is detected whether or not the AF completion flag AFEF carries "1". The flow after step #18 is described in five cases below.

(1) The moment AF operation is completed when the AE lock switch is OFF:

When it is detected that the AF completion flag AFEF does not carry "1", which means the moment that an AF operation has been completed, the program, in this case, advances to step #19 and the AF completion flag AFEF is set to carry "1". Next, it is detected at step #20 whether or not the flag $ALF_1$, which indicates that the AE lock switch is in lock state, carries "1". If not i.e., not in AE lock state, the program advances to step #25 to input the metered light data. That is, the program advances to the subroutine for inputting the metered light data the moment the AF operation has been completed, and then, the metered light data is updated. This state corresponds to the case in which the AF operation has been completed in the state $T_1$ in FIG. 5.

(2) The moment AF operation is completed during AE lock state:

When the flag $ALF_1$ is detected to carry "1" (in AE lock state) at step #20 after the program has advanced from step #18 to step #19, the metered light data is not updated. Then, the program advances to step #50; that is, the AE lock state is maintained. This state corresponds to the case in which the AF operation has been completed during the time periods $T_2$ and $T_4$ in FIG. 5.

(3) After AF operation is completed and the moment the AE lock switch is turned ON:

When it is detected that the level of the signal line AFE is "L" at step #12 and the AF completion flag AFEF carries "1" at step #18, which means that the AF operation has been completed, the program then advances to step #21.

The AE lock switch ALS is detected whether it is ON or not at step #21. If it is ON, the program advances to step #22. At this point, the flag ALF$_2$, which indicates that the AE lock switch ALS has been turned ON, detects whether or not it carries "1". If it does not carry "1", this means that the AE lock switch ALS has turned ON at that moment.

In this case, the program advances to step #23 where both the flag ALF$_2$ which indicates that the AE lock switch ALS has been turned ON and the flag ALF$_1$ which indicates that the AE lock switch is ON are set to carry "1", and then, the program advances to step #25 to input the metered light data. That is, even after the AF operation is completed, the program advances to the subroutine for inputting the metered light data to update the metered light data the moment the AE lock switch ALS has turned ON. In this case, even if the AE lock switch ALS has been turned OFF and the AE lock state is maintained i.e., the flag ALF$_1$ carries "1", a change-over of the AE lock is carried out. This state at this moment corresponds to the time $t_0$ or $t_1$ in FIG. 5 when the AF operation has been completed.

(4) After AF operation is completed and AE lock state is maintained:

The program advances to steps in the order of #12, #18, #21 and #22. If the flag ALF$_2$, which indicates that the AE lock switch ALS is ON, is detected to carry "1" at step 22, the metered light data is not updated and the program advances to step #50; that is, the AE lock state is maintained. This state corresponds to state $T_2$ or $T_4$ in FIG. 5 after an AF operation has been completed.

(5) After AF operation is completed and not during AE lock state

The program advances to steps in the order of #12, #18, and #21. If it is detected at step #21 that the AE lock switch ALS is OFF, the program advances to step #24 and the flag, which indicates that the AE lock switch ALS is ON, is reset, and thereafter, the program advances to step #50 without inputting the metered light data. That is, after the AF operation has been completed, the metered light data is not updated as long as the AE lock switch ALS does not change from OFF to ON and the AE lock state is maintained.

As apparent from the descriptions of the above (a) and (b), when the AE lock switch ALS is turned ON, the metered light data is updated and the state of the AE lock state is maintained irrespective of whether or not AF operation has been completed and whether or not the program is under AF mode or FA mode.

Subroutine for inputting measured light data

Figure 6:
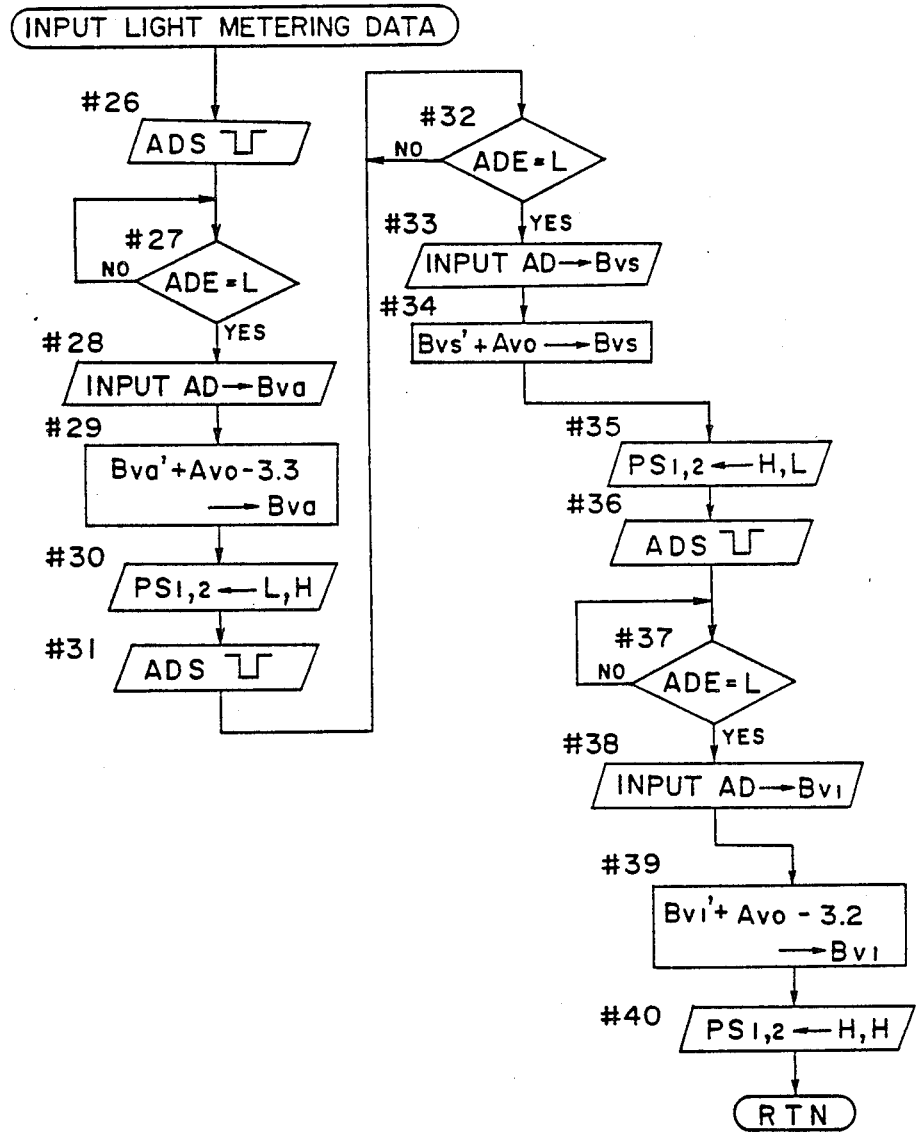
FIG. 6 is a flow chart showing an operation of a subroutine to input metered light data.

The operation of the subroutine for inputting metered light data is described below with reference to FIG. 6.

Average light metering mode

Figure 4:
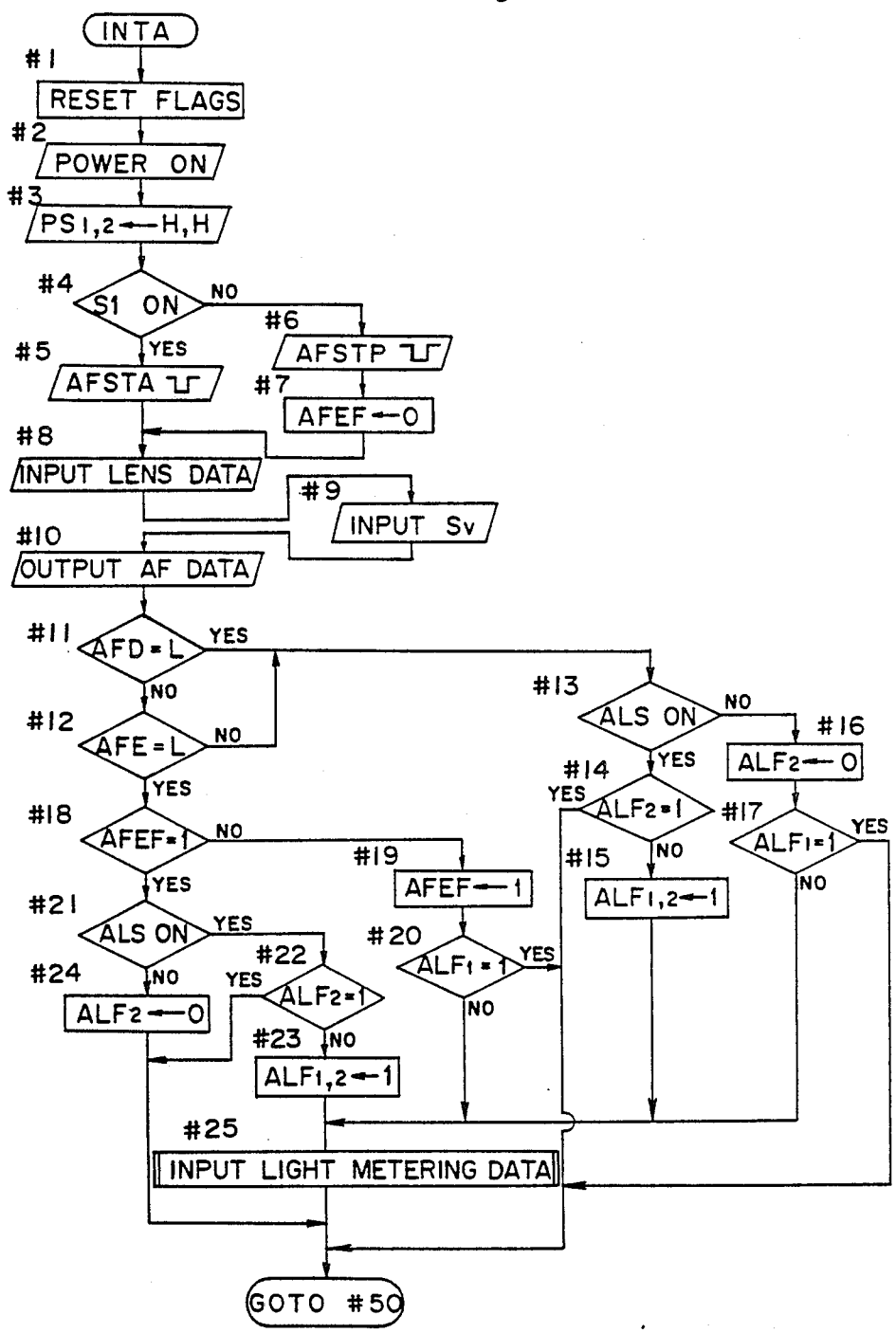
FIG. 4 is a flow chart showing a former part of a main routine of an operation carried out by the control microcomputer shown in FIG. 2.

The program is set in the average light metering mode at step #3 in the flow chart in FIG. 4; that is, the light receiving element PDo for spot zone and the light receiving element PD$_1$ for ambient zone are connected to the light metering circuit LM, so that the reflected light from an object, which was received at both the light receiving elements PDo and PD$_1$, is amplified and logarithmically compressed.

The level of the signal line ADS is temporarily set to "L" at step 26 to activate A/D conversion circuit ADC. Next, after an A/D conversion is completed at step #27 and the level of the signal line ADE is set to "L", the program advances to step #28.

The data to be inputted to the control microcomputer CMC as a result of the A/D conversion is a brightness data of an object which is obtained when the aperture of the lens is fully opened. Assuming that the brightness data of the object in the average light metering mode is Bva, the data Bva' to be inputted to the control microcomputer CMC is the result given by subtracting the minimum aperture value data Avo from the brightness data Bva of the object; that is, $Bva - Avo = Bva'$.

At step #28, the brightness data Bva', which has been inputted to the control microcomputer CMC after A/D conversion, is stored at a register Bva.

An arithmetic, $Bva' + Avo - 3.3$, is executed at step #29. The result is;

$$Bva' + Avo - 3.3 = Bva - 3.3$$

This result is stored in the register Bva. Value "−3.3" in the above is to correct an error which results from the fact that the entire area of the spot zone PDoZ + periphery zone PD$_1$Z in the average light metering mode is ten times as great as that of the spot zone PDoZ in the spot light metering mode i.e., based on the calculation, $\log_2 10 = 3.3$.

Spot light metering mode

The program is set under the spot light metering mode at step #30 by setting the level of the signal line PS$_1$ to "L" and the signal line PS$_2$ to "H"; that is, only the light receiving element PDo for spot zone is connected to the light metering circuit LM. The level of the signal line ADS is temporarily set to "L" at step #31 and the A/D conversion circuit ADC is activated again. After the A/D conversion is completed at step #32 and the level of the signal line ADE becomes "L", the program advances to step #33.

The data to be inputted to the control microcomputer CMC after the A/D conversion is based on the brightness data of an object which is obtained when the aperture of the lens is fully opened. Consequently, assuming that the brightness data of the object in the spot light metering mode is Bvs, the data Bvs' to be inputted to the control microcomputer CMC is the result given by subtracting the minimum aperture data Avo from the object brightness data Bvs; that is, $Bvs - Avo = Bvs'$.

At step #33, the brightness data Bvs' inputted to the control microcomputer CMC after the A/D conversion is stored at a register Bvs.

At step #34, an arithmetic, $Bvs' + Avo$, is executed. The result is $Bvs' + Avo = Bvs$. This result is stored at the register Bvs.

Ambient light metering mode

The program is set in ambient light metering mode by setting the level of the signal line PS$_1$ to "H" and the level of the signal line PS$_2$ to "L" at step #35; that is, only the light receiving element PD$_1$ for the ambient zone is connected to the light metering circuit LM.

At step #36, the level of the signal line ADS is temporarily made "L", thereby activating the A/D conversion circuit ADC again. After the A/D conversion is completed at step #37 and the level of the signal line ADE becomes "L", the program advances to step #38.[3]

Data to be inputted to the control microcomputer CMC after the A/D conversion is the object brightness data which is obtained when the aperture of the lens is fully opened. Accordingly, assuming that the object brightness data in the ambient light metering mode is the data $Bv_1$, the data $Bv_1'$ to be inputted to the control microcomputer CMC is the result given by subtracting the minimum aperture value data Avo from the object brightness data $Bv_1$; namely, $Bv_1 - Avo = Bv_1'$.

At step #38, the brightness data $Bv_1'$, inputted to the control microcomputer CMC after the A/D conversion is effected, is stored at a register $Bv_1$.

At step #39, an arithmetic, $Bv_1' + Avo - 3.2$, is executed. The result is;

$$Bv_1' + Avo - 3.2 = BV_1 - 3.2$$

This result is stored at the register $Bv_1$. Value "−3.2" in the above equation is to correct an error, which results from the area of the ambient zone $PD_1Z$ in the ambient light metering mode is nine times as great as that of the spot zone PDoZ in the spot light metering mode; namely, based on the equation, $\log_2 9 = 3.2$.

After the operation is completed at step #39, the levels of the signal lines $PS_1$ and $PS_2$ are set to "H" at step #40, respectively, the program returns to the average light metering mode, and thereafter, the program advances to step #50.

The description of the main routine (continuation)

Figure 7:
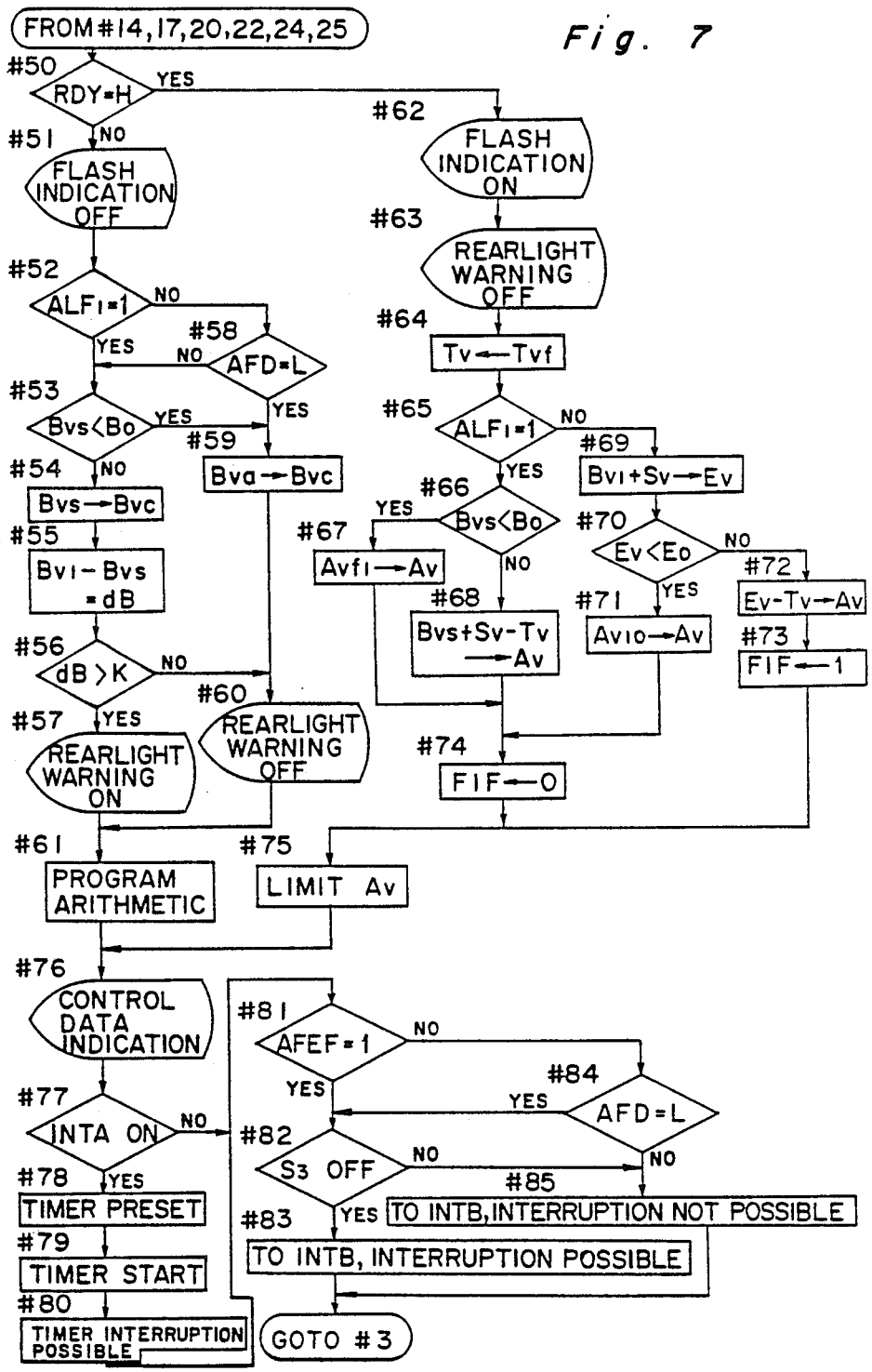
FIG. 7 is a flow chart showing a latter part of the main routine of an operation carried out by the control microcomputer.

The operation of the flow chart in FIG. 7 is described below.

At step #50, it is detected whether or not the level of the signal line RDY, which connects the flash circuit FL to the control microcomputer CMC, is "H"; that is, whether or not the main capacitor of the flash circuit FL has been charged.

Natural light mode

If the level of the signal line RDY is "L", the flash circuit FL has not been charged, which means that the program is under natural light mode, so that a flash indication is not made at the indicator CDP at step #51.

At step #52, it is detected whether the flag $ALF_1$, which indicates AE lock state, carries "1". If the flag $ALF_1$ carries "1" (AE lock state), the program advances to step #53 to compare the size of the brightness data Bvs in the spot light metering mode with that of the data Bo which is a decision criterion of whether the brightness of the object is enough to maintain the linearity between the intensity of light incident on the light receiving element $PD_O$ and the output thereof.

When Bvs < Bo, which means the insufficient brightness, the program advances to step #59, since the linearity of the light data metered by the spot metering cannot be maintained and the brightness data Bva in the average light metering mode is stored at the register Bvc as the exposure controlling brightness data Bvc. Thus, when a brightness is so low that the linearity of the light metering output by the spot light metering cannot be maintained, exposure is controlled by the average light metering mode.

If the detection at step #53 is Bvs ≧ Bo, which means the sufficient brightness, the program advances to step #54 and the brightness data Bvs in the spot light metering mode is stored at the register Bvc as the exposure controlling brightness data Bvc. Thus, when the brightness is such that the linearity of the light metering output by the spot light metering can be maintained, exposure control is accomplished by the spot light metering mode.

At step #55, the brightness difference dB between the brightness data $Bv_1$ in the ambient metering mode and the brightness data Bvs in the spot metering mode is calculated; that is, the following arithmetic is executed.

$$dB = Bv_1 - Bvs$$

Next, at step #56, it is detected whether or not the brightness difference dB is greater than the reference value K which is the decision criterion on whether the lighting is in rear light condition or not.

When $dB = Bv_1 - Bvs > K$, the brightness of the ambient zone $PD_1Z$ is much larger than that of the spot zone PDoZ; namely, in the rear light condition, so that the program advances to step #57. Thereafter, a rear light warning indication is made at the indicator CDP at the step #57, and then, the program advances to step #61.

When $dB = Bv_1 - Bvs \leq K$, the brightness of the ambient zone $PD_1Z$ is not too large compared with that of the spot zone PDoZ, so that the lens is not against the light. Consequently, the program advances to step #60 without making any rear light warning indication, and then, goes to step #61.

When it is detected at step #52 that the flag $ALF_1$ does not carry "1" (AE lock state), the program advances to step #58, and then, it is detected whether the level of the signal line AFD, which connects the AF microcomputer AMC to the control microcomputer CMC, is "L". If the level of the signal line AFD is "H", this means that an AF operation is possible. In this case, the program advances to step #53 so as to carry out an exposure control in the spot metering mode as described above.

If the level of the signal line AFD is "L", this means that an AF operation is impossible or the program is set under FA mode. In this case, the program advances to step #59 and the brightness data Bva in the case of the average metering mode is stored at the register Bvc as the exposure control brightness data Bvc, thereby carrying out an exposure control by the average metering mode.

Next, the program advances to step #60, however, a rear light warning indication is not made by the indicator CDP when an exposure control is accomplished by the average metering mode. Thereafter, the program advances to step #61.

At step #61, exposure control data necessary for an exposure control, namely, the aperture value data Av and exposure time period data Tv according to a program exposure mode are calculated by an arithmetic based on a predetermined program exposure mode, and thereafter, the program advances to step #76 so that the exposure control data is indicated at the indicator CDP.

The exposure control condition of the natural light mode described above is shown in Table 2.

TABLE 2

| Condition | | Exposure control brightness | Rear light warning | No. |
|---|---|---|---|---|
| AE lock | Bvs < B₀ | Bva (Average light metering mode) | No warning | 1 |
| | Bvs ≧ B₀ | Bvs (Spot light metering mode) | Warning when dB > K | 2 |
| AE Impossible FA | | Bva (Average light metering mode) | No warning | 3 |

TABLE 2-continued

| | Condition | Exposure control brightness | Rear light warning | No. |
|---|---|---|---|---|
| Normal mode (No AE lock) | AF possible | Bva ($Bvs < B_0$) (Average light metering mode) | No warning | 4 |
| | | Bvs ($Bvs \geq B_0$) (Spot light metering mode) | Warning when $dB > K$ | 5 |

As shown in FIG. 2, during an AE lock state, an exposure is controlled on the basis of the object brightness data Bvs under the spot metering mode ($Bvs \geq Bo$, See No. 2). However, if the brightness is insufficient when the program is under the spot light metering mode i.e., ($Bvs < Bo$), the brightness on the cell face of the spot zone light receiving element PDo is insufficient and accordingly, the linearity of light metering output is not ensured. As a result, an erroneous exposure control is made. The average light metering mode is adopted to prevent the above-described non-preferable occurrences (See No. 1).

When the AE lock switch is not under the lock mode; that is, the switch is under the normal mode, the following operation is carried out.

That is, when the AF operation is possible and the brightness condition is satisfied; namely, $Bvs \geq Bo$, the brightness data Bvs under the spot metering mode is AE-locked when the AF operation has been completed, thereby exposure being controlled on the basis of the AE locked data Bvs (See No. 5).

When the AF operation is possible, however, the brightness condition is not satisfied; namely, $Bvs < Bo$, exposure is controlled according to the brightness data Bva under the average light metering mode (See No. 4).

When an AF operation is impossible or the program is under FA mode, there is a case that an exposure control is started with a main object out of the spot zone PDoZ, so that an exposure control is carried out according to the brightness data Bva under the average metering mode (See No. 3).

The flow corresponding to No. 1 is in the order of step #52-#53-#59-#60.

The flow corresponding to No. 2 is in the order of step #52-#53-#54-#55-#56-#57 (or #56-#60).

The flow corresponding to No. 3 is in the order of step #52-#58-#59-#60.

The flow corresponding to No. 4 is in the order of step #52-#58-#53-#59-#60.

The flow corresponding to No. 5 is in the order of step #52-#58-#53-#54-#55-#56-#57 (or #56-#60).

Flash mode

When it is detected at step #50 that the level of the signal line RDY is "H", which means that the main capacitor of the flash circuit FL has been charged; that is, the program is under flash mode.

In this case, at step #62 the flash indication is made at the indicator CDP and at step #63 a rear light warning indication is not made. At step #64, the exposure time data Tvf under the flash mode is stored at the register Tv as the exposure time data Tv. Next, at step #65, it is detected whether or not the flag $ALF_1$ which indicates AE lock state carries "1".

When the flag $ALF_1$ carries "1" (AE lock state), the program advances to step #66 to detect whether or not the brightness data Bvs under the spot metering mode is smaller than the reference data Bo.

When $Bvs \geq Bo$, i.e., the brightness condition is satisfied, the program advances to step #68 to execute an arithmetic, $Bvs + Sv - Tv$. Then, the result is stored at the register Av as the aperture data Av. The program advances to step #74, and after the flag FIF, which indicates that light adjustment amount has been changed, is reset (no change in light adjustment amount), the program advances to step #75.

When it is detected at step #66 that $Bvs < Bo$ (insufficient brightness), the program advances to step #67, and thereafter, a fixed aperture value data $Avf_1$, which is determined under the spot metering mode in which AE lock is carried out, is stored at the register Av. Next, the program advances to step #74, and then, the flag FIF, which indicates that light adjustment amount has been changed, is reset, and then, the program advances to step #75.

When it is detected that an AE lock operation is not carried out at step #65, the program advances to step #69.

At step #69, the exposure value data Ev under the ambient metering mode is calculated by the arithmetic $Bv_1 + Sv$, and the result is stored at the register Ev.

Next, the program advances to step #70 to detect whether or not the exposure data Ev is smaller than the reference data Eo. When $Ev < Eo$, the program goes to step #71 to store a fixed aperture value data $Avf_0$ at the register Av. Then, the program advances to step #74, and thereafter, the flag FIF, which indicates that the light adjustment amount has been changed, is reset (no change in light adjustment amount), and then, the program advances to step #75.

When it is detected at step #70 that $Ev \geq Eo$, the program advances to step #72 to execute the arithmetic $Ev - Tv$, and then, the result is stored at the register Av. After the flag FIF, which makes an indication that light adjustment amount has been changed, is set to carry "1" (light adjustment amount has been changed), the program advances to step #75.

At step #75, only when the aperture data Av, $Avf_1$, and $Avf_0$ are out of the range between the minimum aperture value data Avo and the maximum aperture value data Avmax, the data Av, $Avf_1$, and $Avf_0$ are limited to the minimum aperture value data Avo or the maximum aperture value data Avmax.

The condition of the exposure control of the above-described flash modes are shown in Table 3.

TABLE 3

| | Condition | Aperture date | Exposure time period data | No. |
|---|---|---|---|---|
| AE lock | $Bvs < B_0$ | Avf1 (Fixed) | Tvf | (1) |
| | $Bvs \geq B_0$ | $Bvs + Sv - Tvf = Av$ (Spot light metering mode) | Tvf | (2) |
| Normal mode | $B_{v1} + Sv < E_0$ | Avf0 (Fixed) | Tvf | (3) |
| | $B_{v1} + Sv \geq E_0$ | $B_{v1} + Sv - Tvf = Av$ (Ambient light motoring mode; Change of light Adjustment amount) | Tvf | (4) |

As shown in Table 3, in the case of No. (2), in which the brightness condition is satisfied ($Bvs \geq Bo$) in AE lock state, an aperture control is made under the spot metering mode, while in the case of No. (1), in which the brightness is insufficient ($Bvs < Bo$) under the spot metering mode, an aperture control is carried out according to the fixed aperture value data $Avf_1$.

In the case of No. 4, in which the brightness condition is satisfied ($Bv_1 + Sv \geq Eo$) in non-AE lock state (normal mode), an exposure control is performed under the ambient metering mode. On the other hand, in the case of No. (3), in which the brightness is insufficient ($Bv_1 + Sv < Eo$) under the ambient metering mode, an exposure control is carried out according to the fixed aperture value data Avfo. In the case of No. (3), in which an exposure control is performed under the ambient metering mode, the light amount to be directed to the object is reduced and a greater amount of natural light is added to an intended object, thereby preventing the adjusted light amount being excessive.

Figure 8:
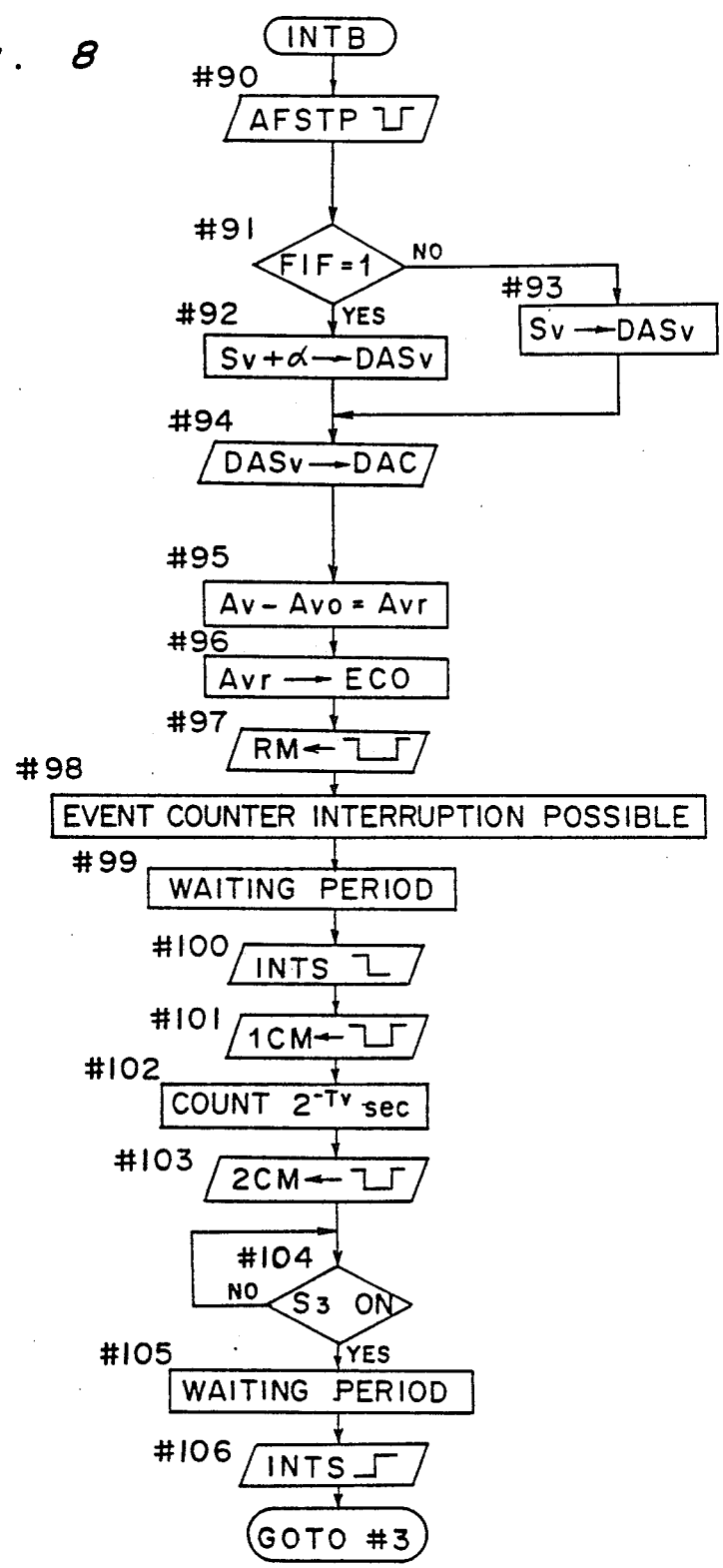
FIG. 8 is a flow chart showing an operation of an INTB interruption subroutine.

A change of the light adjustment amount is carried out according to whether the flag FIF, which indicates a change of the light adjustment amount, is detected to carry "1" or "0" at step #91, described below in FIG. 8, when an exposure control is carried out.

Following is an example of the exposure time data Tvf and the fixed aperture value data $Avf_1$ and Avfo:

Tvf = 1/60 sec
$Avf_1$ = F 5.6
Avfo = F 2.8

The flow, which corresponds to No. (1), is step #65-#66-#67-#74.

The flow, which corresponds to No. (2), is step #65-#66-#68-#74.

The flow, which corresponds to No. (3), is step #65-#69-#70-#71-#74.

The flow, which corresponds to No. (4), is step #65-#69-#72-#73.

After a program arithmetic is carried out at step #61 or an aperture value limitation; i.e., Av limitation, is made at step #75, the program advances to step #76, and then, an exposure control data is indicated by the indicator CDP.

It is detected at step #77 whether the interruption terminal INTA is ON or OFF; that is, it is detected that either the light metering switch $S_1$ or the AE lock switch ALS is ON. If any one of the switches is ON, the program advances to step #78. Next, a timer which has a time limit of about 5 seconds is preset, and then, the operation of the timer is started at step #79 to permit an interruption of the timer at step #80, and then, the program advances to step #81.

The flow from step #78 through #80 is the operation carried out by the timer hold for keeping the electrical power supply from the electrical supply battery BA. While either the light metering switch $S_1$ or the AE lock switch ALS is ON, the timer is repeatedly preset. More specifically, after the above-described time limit of about 5 seconds elapses, the program advances to the timer interruption routine shown in FIG. 10, and then, the electrical power supply from the electrical source battery BA is stopped.

Before the time limit elapses, if the program advances from step #81-#82-#83 (or #85) and returns to step #3, and if either the light metering switch $S_1$ or the AE lock switch ALS is ON, the timer is preset again.

When neither the light metering switch $S_1$ nor the AE lock switch ALS is detected to be ON, the program advances to step #81 without presetting the timer.

Thereafter, the program returns to step #3 after the program has advanced from step #81-#82-#83 (or #85); that is, the timer is advanced with light metering arithmetic repeated, until either the light metering switch $S_1$ or the AE lock switch ALS is turned ON within 5 seconds. If neither the light metering switch $S_1$ nor the AE lock switch ALS is turned ON within 5 seconds, the program advances to the time interruption routine shown in FIG. 10.

It is detected at step #81 whether or not the flag AFEF, which indicates that the AF operation has been completed, carries "1". If the AF operation has been completed, the program advances to step #82, and then, it is detected whether the reset switch $S_3$ is OFF or ON. OFF state of the reset switch $S_3$ means that the shutter has been charged, so that exposure control may be started. Consequently, the program advances to step #83, and then, returns, to step #3 after permitting an interruption of the interruption terminal INTB; namely, permitting the shutter release operation.

When it is detected that the flag AFEF, which indicates that the AF operation has been completed, carries "0", the program advances to step #84, and then, it is detected whether the level of the signal line AFD is "L". If it is "L", the program advances to step #82. At this point, if the shutter has been charged, a shutter release impossible.

If it is detected at step #82 that the reset switch $S_3$ is ON, the shutter has not been charged and an exposure control cannot be started, so that the program advances to step #85, and thereafter, returns to step #3 after prohibiting an interruption of the interruption terminal INTB; namely prohibiting the shutter release operation.

Thus, if a focus detection is possible under AF mode the shutter cannot be released unless a focussing can be accomplished; that is, the AF operation has priority over the exposure operation.

INTB interruption subroutine

The operation of INTB interruption subroutine is described with reference to the flow chart in FIG. 8. When the shutter release switch $S_2$ is turned ON by a depress of the shutter release button to the second step, an interruption of the interruption terminal INTB of the control microcomputer CMC is permitted, and the program advances to step #90. At step #90, the level of the signal line AFSTP is temporarily made "L" to stop the operation of the AF microcomputer AMC.

At step #91, the flag FIF, which indicates a change of light adjustment amount, is detected to carry "1". If there is any change in light adjustment amount, the program advances to step #92, and after data $Sv + \alpha$ is stored at the register DASv, which stores the film sensitivity data Sv, the program advances to step #94. Here, "$+\alpha$" means such that an under exposure is carried out by an amount of $\alpha$.

If it is detected at step #91 that there is no change in light adjustment amount, the program advances to step #93, and then, after the film sensitivity data Sv is stored at the register DASv, the program advances to step #94.

At step #94, after the content of the register DASv is transferred to the D/A conversion circuit DAC, an arithmetic, $Av - Avo = Avr$, is then executed at step #95.

The result Avr of the arithmetic is stored at the register Avr which determines the number of diaphragm stop-down steps. Next, at step #96, the content of the register Avr is set at the event counter ECO.

At step #97, the release magnet RM is demagnetized to start stopping down of the diaphragm, and then, an interruption of the event counter ECO is permitted at step #98.

Figure 9:
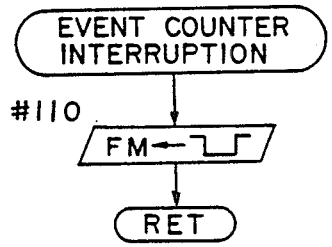
FIG. 9 is a flow chart showing an operation of an event counter interruption subroutine.

The aperture encoder $ENC_1$ outputs pulse signal in unison with the stopped down steps of the diaphragm, and the stopping down operation is stopped when the number of the outputted pulses coincide with the content of the register Avr. The reflection mirror is turned up at the same time when the stopping down operation is made. The diaphragm stopping down operation is interrupted by an interruption of the event counter. This diaphragm stopping down interruption is carried out at step #110 by demagnetizing a diaphragm magnet FM as shown in FIG. 9.

After the diaphragm magnet FM is demagnetized, the program returns to step #99. The operation of step #99 is to wait for a certain period of time until the diaphragm stopping down operation and a turning up of the mirror operation are completed after the demagnetization of the release magnet RM. Immediately after the mirror is turned up, the light metering element PDF receives the light which has been reflected from an object and passed through the objective lens.

At step #100, the signal line INTS, which connects the AND gate $AN_1$ to the control microcomputer CMC, is allowed to become level "L" so that the AND gate is activated.

At step #101, the first curtain magnet 1CM is demagnetized to start the first curtain. After the first curtain travels all the way to a predetermined point, the switch SX is changed over from the contact $a_2$ to the contact $b_2$, and the flash circuit FL emits light, and the level of the output from the AND gate $AN_1$ becomes "H", so that an integration operation of reflected light from the object is started.

At step #102, exposure time, for example $2^{-TV}$ sec, is counted. After the count-up, the program advances to step #103. Then, the second curtain magnet 2CM is demagnetized to start a travel of the second curtain. During this period of time, the output level of the integrator INTE reaches the level of the reference power source Vr and the signal with the level "H" is outputted to the signal line STOP, so that the flash circuit FL stops the light emission.

At step #104, the program waits until the reset switch $S_3$ is turned ON; namely until the exposure has been completed, and then, the program advances to step #105 where the program waits for a certain period of time for stabilization. Next, at step #106, the level of the signal line INTS is made "H" and AND gate $AN_1$ is shut off, and the program returns to step #3 for the next exposure.

Timer interruption subroutine

The operation of the timer interruption subroutine is described with reference to the flow chart shown in FIG. 10.

After the elapse of the time period of about 5 seconds of the timer hold carried out in steps #78 through #80 shown in FIG. 7, the program advances to step #111 when a timer interruption is permitted, and then, all of the output port levels of the control microcomputer CMC is made "H" so as to initialize the program. The timer hold terminates at the time $t_2$ shown in FIG. 5. At this point, the AE lock operation in the spot light metering mode is released.

Next, after all of the flags are reset at step #112, an interruption of the interruption terminal INTA is permitted at step #113. This interruption is accomplished when the light metering switch $S_1$ or the AE lock switch ALS is ON. The description of this occurrence has already been made.

Next, the indication made by the indicator CDP is stopped at step #114 and the flow terminates.

The operation of the timer interruption subroutine is carried out as well when the power source battery BA is loaded and a voltage is applied to the reset terminal RES of the control microcomputer CMC.

The operation of AF microcomputer AMC

The operation of the AF microcomputer AMC is described with reference to the flow chart shown in FIG. 11.

Referring to a flow shown in FIG. 4, when the level of the signal line AFSTA is made "L", an interruption of the interruption terminal $INT_0$ of the AF microcomputer AMC is permitted, the program advances to step S1 to permit an interruption of the interruption terminal $INT_1$, namely to permit the receiving of a stop signal for stopping the AF microcomputer.

Next, the levels of the signal line AFE and AFD are made "H" at step S2 to initialize the AF microcomputer AMC.

At step S3, a brightness distribution is measured by the AF light receiving element CCD and the data accumulated at the AF light receiving element CCD is read out into the AF microcomputer AMC through the interface AIF at step S4.

Next, at step S5, a lens data for an AF operation is read out into the AF microcomputer AMC from the control microcomputer CMS. This lens data is the automatic focus adjustment data of the data inputted from the lens data output circuit LEC to the control microcomputer CMC at step #8 in FIG. 4.

At step S6, defocus amount is calculated according to the brightness distribution data read out in the microcomputer AMC. At step S7, the reliability of the calculated defocus amount is detected. It is when the contrast of brightness distribution of an object is, usually, low that a calculated defocus amount is detected to be unreliable.

If the calculated defocus amount is reliable, it is detected at step S8 whether the program is under FA mode. It it is under AF mode, the program advances to step S9. If under FA mode, the program advances to step S17.

At step S9, it is detected whether or not the objective lens is in an in-focus state. Commonly, the lens is not in the in-focus state at the initial stage. If it is not in an in-focus state, the program advances to step S10 to decide whether the flag AFCF, which indicates an in-focus state, carries "1".

If it is detected that the lens is not in an in-focus state, the program advances to step S11 to drive the motor MO so that the lens unit in the interchangeable lens is moved along the optical axis. At step S12, the program waits until the lens unit is at the in-focus position.

In order to detect whether the lens unit has moved to the in-focus position or not, the rotation amount of the motor MO, which is driven for focussing according to the defocus amount, is compared with the rotation amount corresponding to the number of pulses transmitted from the encoder ENC for AF mode. If both of the rotation amount is the same, it is detected that the objective lens is in the in-focus state.

After the objective lens has moved to the in-focus position, the program advances to step S13 to stop the motor MO so that the lens unit movement is stopped. Thereafter, the program advances to step S14, and then, the flag AFCF, which indicates the in-focus state, is set to carry "1".

If it is detected at step S9 that the objective lens is in in-focus state or if it is detected at step S10 that the flag AFCF, which indicates that the objective lens has moved to the in-focus state, carries "1" i.e., the objective lens has been in in-focus state even once even if the lens is not in in-focus state now, the program advances to step S14; that is, if the lens has ever been in in-focus state, the lens is not moved irrespective of whether the front-focus state or rear-focus state is detected i.e., the position of the lens is fixed (AF lock; under one shot mode).

After the flag AFCF, which indicates that the lens has been in in-focus state, is set to carry "1" at step S14, the indicator ADP indicates that the lens has been in in-focus state at step S15. Thereafter, the signal line AFD is made "H" level at step S16, and then, the program advances to step S23. Next, the signal line AFE is made "L" to allow it to transmit to the control microcomputer CMC that the lens has been in in-focus state, and then, the program returns to step S3.

If it is detected at step S8 that the program is under FA mode, the program advances to step S17 to detect whether or not the lens is in in-focus state; that is, the lens is at front-focus or rear-focus position or in-focus position. At step S18, the indicator ADP makes an indication of the position of the lens, i.e., indication of whether the lens is at front-focus or rear-focus or in-focus position. Next, the program advances to step S19 to make the level of the signal line AFD "L", thereby transmitting to the control microcomputer CMC that the program is under FA mode, and then, the program advances to step S23.

If step S7 detects that the calculated defocus amount is not reliable, the program advances to step S20 to decide whether or not the program is under FA mode.

If the program is under AF mode, it is detected at step S21 whether the flag AFCF, which indicates that the lens has been in in-focus state, carries "1".

If the flag AFCF is detected that it is carrying "1", which means that the contrast of the brightness distribution is low according to a light metering carried out after the lens has moved to the in-focus position under AF mode, the program in this case, goes, in order, to steps S14, S15 and S16 to make an in-focus indication, and then, the program advances to step S23.

If it is detected at step S21 that the flag AFCF, which indicates that the lens has been in in-focus state, does not carry "1", the program advances to step S22, and then, the AF indicator ADP makes a warning that the contrast of the brightness distribution of the object is low. Thereafter, the level of the signal line AFD is made "L" at step S19 to allow it to transmit to the control microcomputer CMC that an AF operation is impossible. Thereafter, the program advances to step S23.

If it is detected at step S20 that the program is under FA mode, the program is allowed to flow from step S22 to S19 to make an indication of low contrast as well as to transmit to the control microcomputer CMC that the AF operation is impossible. Then, the program advances to step S23.

At step S23, the signal line AFE is switched to "L" level to transmit the signal to the control microcomputer CMC that the AF operation has been completed. Then, the program returns to step S3.

If the level of the signal line AFD is "H" and the program is not in AE lock state, the level of the signal is switched to "L" level, thereby an AE lock is accomplished by the control microcomputer CMC. If the program is under FA mode or cannot be executed under AF mode, detection is carried out by allowing the signal line AFD to have priority over the signal line AFE. The program does not become unstable if the level of the signal line AFE is switched to "L".

The following flows mean completions of the AF operation. Step S7-S8-S9-S10-S11-S12-S13-S14-S15-S16. Step S7-S8-S9-S14-S15-S16. Step S7-S8-S9-S10-S14-S15-S16. Step S7-S20-S21-S14-S15-S16.

By FA mode is meant the flow from step S7-S8-S17-S18-S19 and from step S7-S20-S22-S19.

The flow from step S7-S20-S21-S22-S19 means that the AF operation is impossible.

INT$_1$ interruption subroutine

Figure 12:
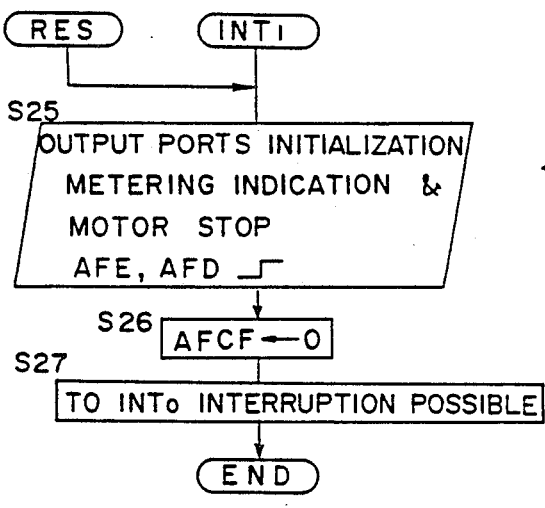
FIG. 12 is a flow chart showing an operation of an $INT_1$ interruption subroutine of the AF microcomputer.

The operation of INT$_1$ interruption subroutine, when the level of the signal line AFSTP is temporarily at negative edge, is described with reference to FIG. 12.

The levels of all of the output ports are switched to "H" at step S25 so as to initialize the AF microcomputer AMC. This stops the measurement of the brightness distribution on the AF light receiving element CCD, the indication of the AF indication ADP, the operation of the motor MO, and the operation of the AF microcomputer AMC by switching the levels of the signal line AFE and AFD to "H".

At step S26, the flag AFCF, which indicates that the lens has been at in-focus position, is reset and at step S27 an interruption of the terminal INTo is allowed, and then, the program flow terminates.

The operation of the interruption subroutine INT$_1$ is executed as well when the power source battery BA is mounted and voltage is applied to the reset terminal of the control microcomputer CMC.

Although the present invention has been fully described by way of example with reference to the accompanying drawings, it is to be noted, here, that various changes and modifications will be apparent to those skilled in the art.

In the embodiment described above, the detection as to whether the linearity of the output of the light receiving element under the spot light metering mode can be maintained is made by comparing Bvs with Bo after the arithmetic, $(Bvs-Bvo)+Avo=Bvs$, is executed. It is to be noted, however, the brightness on the cell face of the light receiving element is influenced by the minimum aperture value of the lens. Therefore, this detection can be preferably performed by storing the arithmetic, $Bvs-Avo=Bvs'$, which is the value before Bvs is solved, at another register so as to adopt the spot metering value when $Bvs' \geq Bo'$ and the average metering value when $Bvs' < Bo$, were $Bo' < Bo$.

Figure 13:
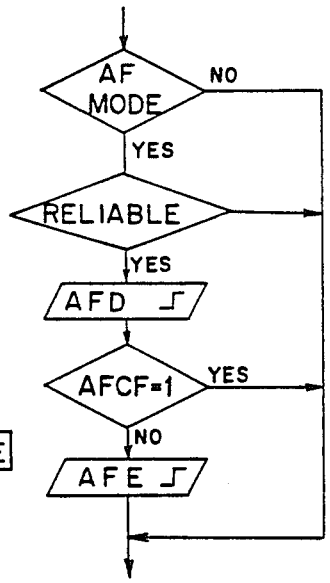
FIG. 13 is a flow chart showing a modification of FIG. 4.
Figure 11:
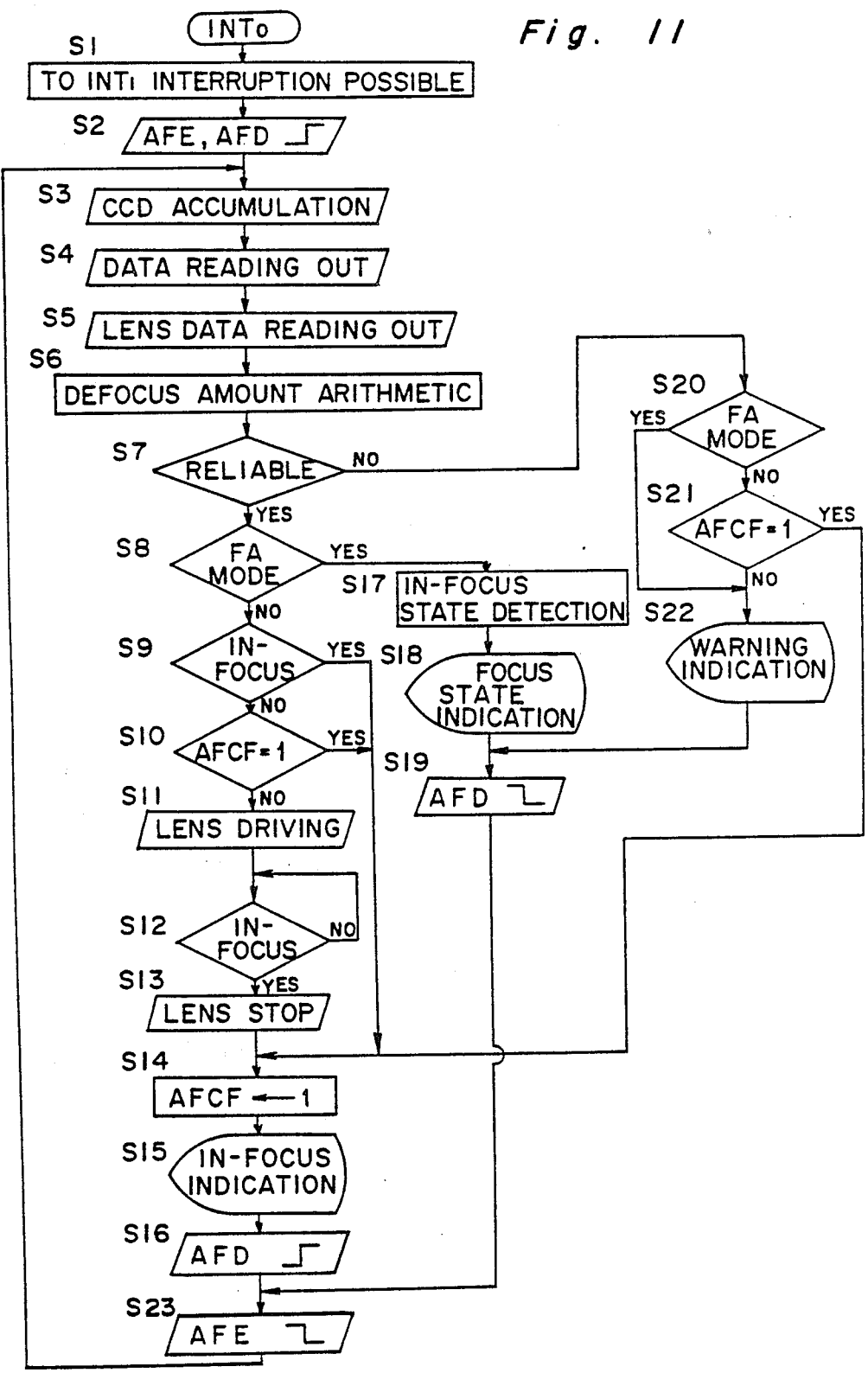
FIG. 11 is a flow chart showing a routine of an operation carried out by an AF microcomputer.

In the flow for the automatic focus adjustment shown in FIG. 11, when the program operated under FA mode is switched to AF mode during the FA operation, the signal line AFD maintains level "L" until the operation under AF mode terminates because when the program is under FA mode, the levels of the signal lines AFD and AFE are both "L", and the level of the signal line AFD becomes "H" when the AF operation has been completed, and the signal line AFE maintains "L". As such, it happens that a shutter is released even under AF mode. This can be prevented by inserting the flow shown in FIG. 13 between step S23 and S2, step S3 and S4, or step S6 and S7 in the embodiment described above.

The program in the above-described embodiment is so constructed that when the flag AFEF, which indicates that an AF operation has been completed, carries "0" at step #81 in FIG. 7, the program advances to step #84 to prohibit an interruption of the interruption terminal INTB i.e., a shutter release, whereby a shutter is not released unless an in-focus detection is carried out under AF mode (AF operation priority). However, the apparatus of the invention is not only applied for this system, but also applied for a camera having a shutter release priority system i.e., a shutter can be released at any desired point even if the lens is not at an in-focus position.

In the embodiment described above, shutter release priority system is adopted whether or not lens is at the in-focus position when the program does not work under AF mode and when the program is under FA mode. However, the camera system may be so constructed that a shutter cannot be released when the program does not function under AF mode.

According to another embodiment, the shutter release may be permitted regardless of whether or not the camera system is in an in-focus state i.e., regardless of whether the signal inputted from the AF microcomputer AMC to the control microcomputer CMC by the signal line AFD is "H" or "L".

The above-described structure can be embodied by abbreviating step #81. The reason is that when an AF operation has been completed, the flag AFEF is set to carry "1" at step #19 in FIG. 4 and when an AF operation has not been completed, the flag AFEF is reset at step #1, however, the state of the flag AFEF is irrelevant to a shutter release.

In this structure, an exposure control is carried out in the condition as shown in Table 4.

TABLE 4

| Focus detection possible | AF not completed | Spot light metering data immediately before shutter release (including distance metering zone) |
| | AF completed | AE locked spot light metering data upon AF |

TABLE 4-continued

| Focus detection impossible | AF not completed | completion Average light metering data immediately before shutter release |

More specifically, turning ON of the release switch S3, when an AF operation has not been completed, permits an exposure control operation according to metered light data under spot light metering mode immediately before a shutter is released.

The camera system in the above described embodiment is provided with the light receiving element PDo for spot zone and the light receiving element $PD_1$ for the ambient zone as the light receiving portion for a light metering in addition to the spot light metering mode and the ambient light metering mode which are independently operated, the average light metering mode is provided to operate the above-described two light receiving elements. On the other hand, the invention can be embodies if the average light metering mode is not adopted or only one of the two light receiving elements is provided.

Therefore, unless otherwise such changes and modifications depart from the scope of the present invention, they should be construed as included therein.

What is claimed is:

1. A camera with an automatic focus adjusting apparatus comprising:
   focus adjusting means for automatically adjusting a focusing condition of an objective lens of the camera to produce an in-focus signal when the objective lens is adjusted to an in-focus condition;
   light metering means for metering brightness of an object and outputting a light metering signal in accordance with the metered result;
   means for outputting a lock signal in response to a manual operation at any desired time before an exposure operation of the camera is started;
   lock means for locking the light metering signal in response to either of the in-focus signal and the lock signal;
   means for prohibiting the lock means from locking the light metering signal in response to the in-focus signal when the lock means has already locked the light metering signal in response to the lock signal; and
   means for permitting the lock means to lock the light metering signal in response to the lock signal after the lock means has locked the light metering signal in response to the in-focus signal.

* * * * *